United States Patent [19]

Nelson

[11] 4,277,018

[45] Jul. 7, 1981

[54] CLOCK THERMOSTAT APPARATUS FOR RESETTING THE TEMPERATURE OF A SPACE DURING SELECTED TIME PERIODS WITH MEANS FOR VARYING THE PICKUP TIME AS A FUNCTION OF THE DROP IN SPACE TEMPERATURE DURING THE SETBACK PERIOD

[75] Inventor: Lorne W. Nelson, Bloomington, Minn.

[73] Assignee: Honeywell Inc., Minneapolis, Minn.

[21] Appl. No.: 83,914

[22] Filed: Oct. 11, 1979

[51] Int. Cl.³ .............................................. F23N 5/20
[52] U.S. Cl. .................................... 236/46 R; 165/12
[58] Field of Search ...................... 236/46 R; 165/12; 337/302–305

[56] References Cited

U.S. PATENT DOCUMENTS

| | | | |
|---|---|---|---|
| 1,869,161 | 7/1932 | Merrill | 236/46 R |
| 3,393,868 | 7/1968 | Griem, Jr. | 236/46 X |
| 4,172,555 | 10/1979 | Levine | 236/46 R |

FOREIGN PATENT DOCUMENTS 4524  3/1978  European Pat. Off. .............. 236/46 R

*Primary Examiner*—William E. Wayner
*Attorney, Agent, or Firm*—Clyde C. Blinn

[57] ABSTRACT

A clock thermostat apparatus for controlling the temperature in a space at different temperatures depending upon the time period of the time controlled apparatus has a second temperature responsive apparatus responsive to space temperature for determining the pickup time required to bring the temperature of the space back to normal after a period of setback. When the space temperature drops a small amount, the pickup time for bringing the space back to a normal temperature is short; however, during cold weather conditions when the space temperature drops a large amount, a greater pickup time period is scheduled.

1 Claim, 7 Drawing Figures

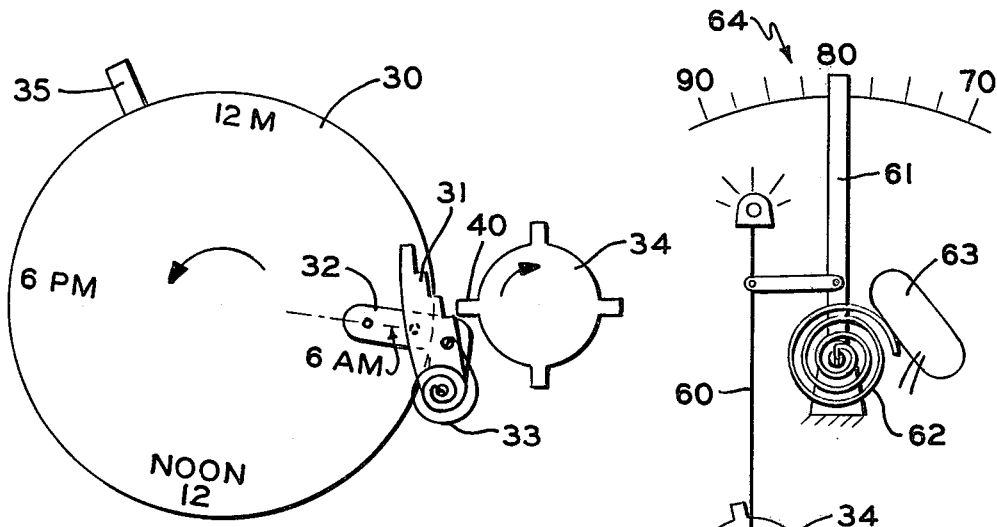
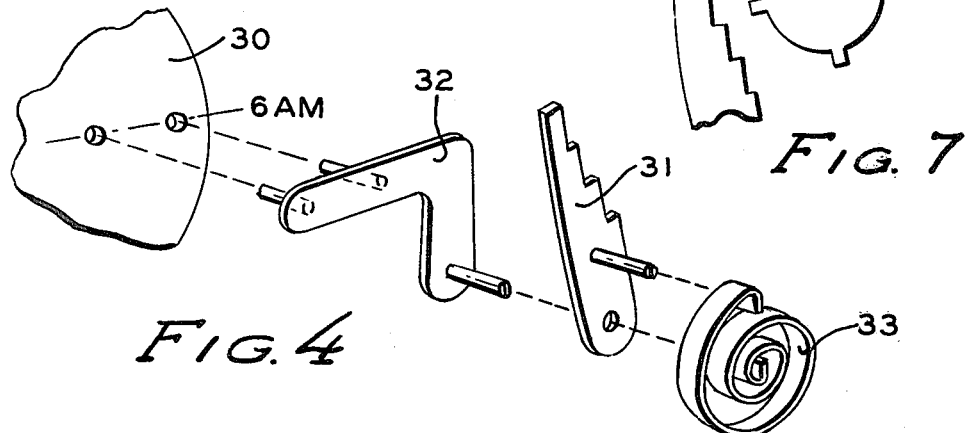
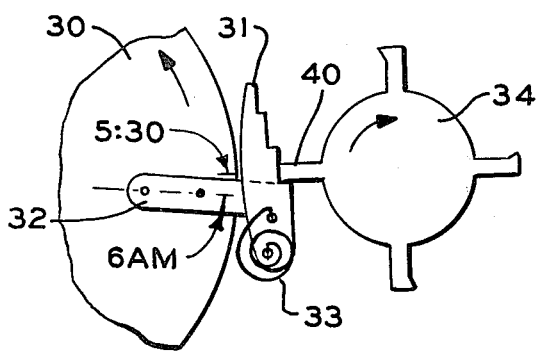
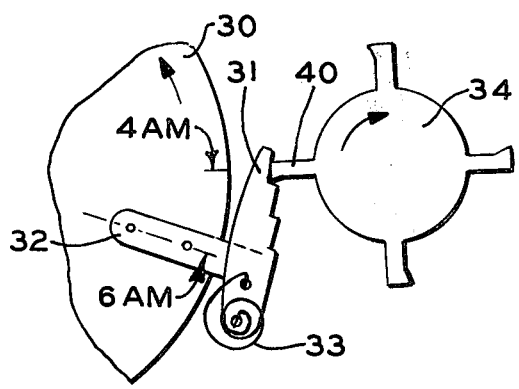

CLOCK THERMOSTAT APPARATUS FOR RESETTING THE TEMPERATURE OF A SPACE DURING SELECTED TIME PERIODS WITH MEANS FOR VARYING THE PICKUP TIME AS A FUNCTION OF THE DROP IN SPACE TEMPERATURE DURING THE SETBACK PERIOD

BACKGROUND AND SUMMARY OF THE INVENTION

Clock thermostat apparatus for controlling the temperature of a space and resetting the temperature for energy conservation during selected time periods is broadly old, as shown in the Carl G. Kronmiller U.S. Pat. No. 2,558,617, which issued June 26, 1951, wherein a cam member is used to reset the control point of the space temperature responsive means to a lower value to control the space temperature below a normal temperature during selected periods of time.

With such setback thermostats, there has always been a desire to vary the pickup time of the temperature conditioning apparatus at the end of the setback period to have the space temperature up to a normal temperature at a certain desired time. Various ways of accomplishing such have been used, such as a cam surface which is designed to vary the pickup time. Even more elaborate systems are used where the pickup time is adjusted by an outdoor temperature responsive element.

The present invention is concerned with a simple, less expensive apparatus for varying the pickup time as a function of the conditioning load which the building is experiencing. As the conditioning load increases, the space temperature will drop a greater amount from the normal temperature during the setback time period. A temperature responsive means responsive to the drop in the space temperature during the setback time is used to select the required pickup time needed to bring the space temperature back to normal at a desired time.

Specifically, an inside temperature responsive means is used for resetting the space temperature responsive control to the normal temperature. The resetting operation is started at different time periods depending upon the drop in the space temperature occurring during the setback time period.

DESCRIPTION OF THE DRAWING

FIG. 3 is a detailed showing of the time controlled apparatus having the means for varying the pickup time with space temperature, FIG. 4 is a perspective view of the apparatus of FIG. 3, FIGS. 5 and 6 are showings of the apparatus of FIG. 3 for different space temperature pickup operations, and FIG. 7 is another embodiment of the invention of FIG. 1.

DESCRIPTION AND OPERATION OF THE INVENTION

Figure 1:
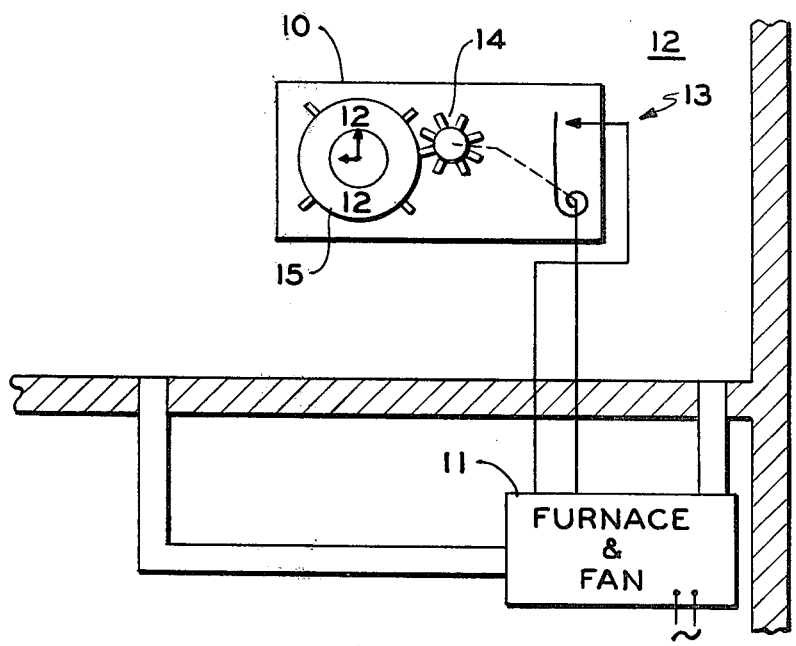
FIG. 1 is a schematic representation of a clock thermostat apparatus when used with a temperature conditioning means.

Referring to FIG. 1, a clock thermostat apparatus 10 is connected to control the operation of a space condition responsive apparatus or furnace 11 for controlling the temperature in a space 12. A temperature responsive switch means or thermostat 13 is connected to the furnace 11 to control the furnace and maintain the temperature in space 12 at a normal desired temperature. A reset mechanism 14 which is driven by a time control apparatus or clock 15 provides for the resetting of the temperature control point of the temperature responsive switch means 13 at different time periods similar to the operation of the apparatus as shown in the mentioned Kronmiller patent. By the adjustment of time controlled apparatus 15, the control point of the temperature responsive switch means 13 can be reset from the selected normal control temperature for a setback operation for a selected period of time to reset the normal control temperature either up or down depending upon whether a heating or cooling operation is taking place to conserve energy during the setback period.

Figure 2:
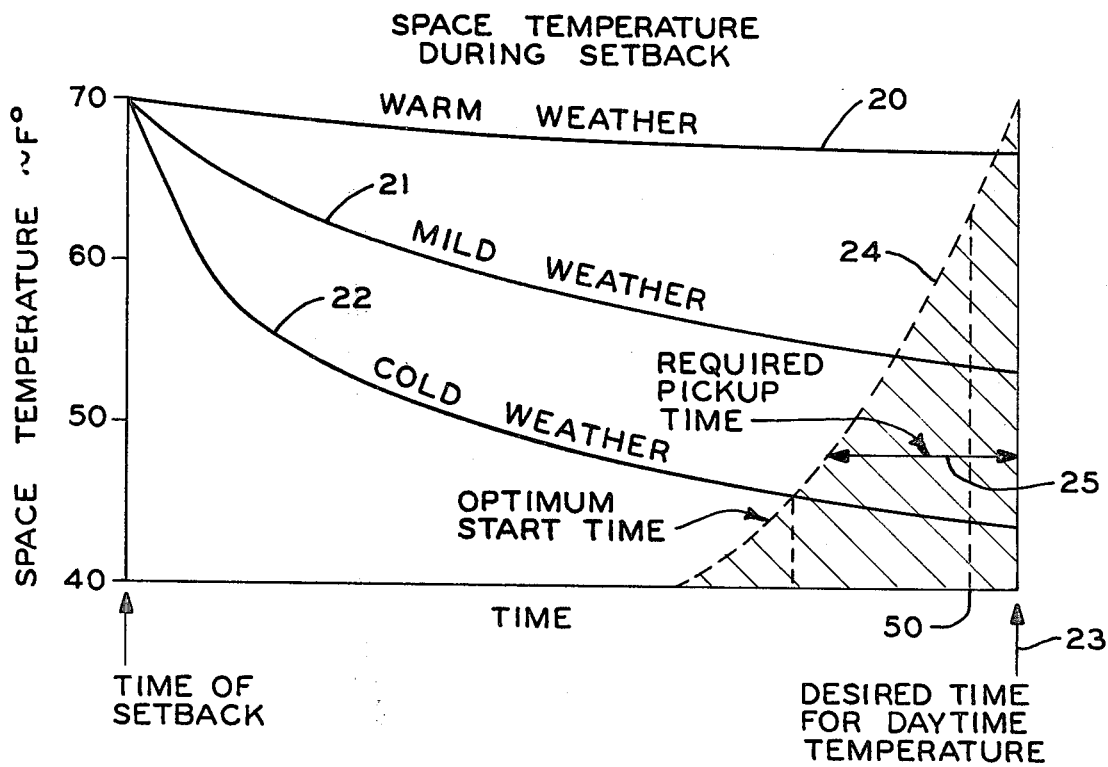
FIG. 2 is a graphical representation of the change in space temperature depending upon time and the various condition loads in the building.

In FIG. 2, a graphical representation of the change or drift in space temperature, starting at the selected time over a setback time period, is shown for different space conditioning loads or weather conditions. If for example, the temperature is being controlled at 70°, the drop in space temperature will vary depending upon the weather or load on the space or building. During warm weather, the space temperature will drop rather gradually as shown by the curve 20 over a time period during which the setback condition is desired. During mild weather, the temperature would drop as shown in curve 21 and during cold weather, a drop is experienced as shown in curve 22. Obviously, various degrees or rates of change in the space temperature depend upon the conditioning load. To return the space temperature back to the normal desired temperature at a desired time of day, shown at 23, the pickup time for this optimum operation is shown by a curve 24. When the space temperature drops or the load by the weather conditions on the building becomes greater, the desired time for pickup as shown for one particular condition at 25 would increase.

Assuming that the time control apparatus has a cam surface as shown in FIG. 3 with a rotating member 30 which rotated under the power of a clock mechanism, a pickup member 31 is attached at some predetermined time such as at the 6:00 a.m. level by member 32. Member 31 is pivotally connected to member 32 and positioned by a bimetal or temperature responsive element 33. Member 34 is connected to the temperature responsive switch means 13 to vary the control point of the responsive means from a normal control point to some lower control point for the setback time period. A setback member such as 35 moves member 34 to the setback operation. As the time control mechanism moves counterclockwise and member 31 came to member 34, it would engage the next operating projection 40 on the stepped dog 31 depending upon the position of member 31 to schedule the pickup time in response to the space temperature.

As shown in FIG. 5, pickup member 40 of member 34 is engaging the lower step of the dog member 31 which is indicated as a 5:30 a.m. pickup time as the temperature of bimetal 33 has only dropped a slight bit to a relatively mild weather condition might be indicated as the pickup line shown in FIG. 2 at 50. If, for example, a cold weather condition existed and the space temperature dropped considerably during the setbackttime period, a different pickup time is selected as shown by the operation in FIG. 6. Member 40 engages a higher step on the dog 31 as the bimetal 33 has moved the dog clockwise with respect to member 32 during the setback time in response to the space temperature which has deviated from the normal space temperature during the "off" operation time of the conditioning apparatus.

DESCRIPTION AND OPERATION OF SECOND EMBODIMENT OF THE INVENTION

Another embodiment of the invention is shown in FIG. 7. Member 34 is positioned by lever 60 when a selected or normal temperature control temperature is selected by selector lever 61 to adjust a main temperature control or bimetal 62 for switch 63 of the thermostat to control at a temperature of the scale 64. When a lower setting for the normal temperature control is made by lever 61 the temperature drop during the setback time period is less; therefore the time for pickup would be shorter. Movement of member 34 to the right for a lower normal temperature setting of lever 61 effectively shifts curve 24 of FIG. 2 to the right. The pickup time is then adjusted to be indicative of the temperature drop during the setback operation that is the difference between a normal control temperature and the temperature to which the space has dropped during the rest period.

The embodiments of the invention in which an exclusive property or right is claimed are defined as follows:

1. In a time controlled thermostat apparatus for providing a normal operation and no operation during a setback time period comprising, first temperature responsive switch means adapted for controlling the operation of a temperature conditioning apparatus for maintaining a predetermined normal temperature in a space, time controlled means connected to said temperature responsive switch means terminating the operation of the temperature conditioning apparatus for a predetermined time period and then restoring the operation for a temperature setback operation, and second temperature responsive means responsive to space temperature connected to said time controlled means for varying the operation of said first temperature responsive switch means for starting the operation of said conditioning apparatus at a time depending on the space temperature which drops from said normal temperature during the setback time period when the operation of said temperature conditioning apparatus was terminated, said first temperature responsive means is a switch mechanism having an operation position for a normal temperature control and a non-operation position, said time control means is a rotating member, and said second temperature responsive means is a member mounted on said rotating member having a stepped member for engaging said first temperature responsive means to move it from a non-operating position to an operating position.

* * * * *